United States Patent [19]

Tsuchimoto et al.

[11] 4,414,620
[45] Nov. 8, 1983

[54] INTER-SUBSYSTEM COMMUNICATION SYSTEM

[75] Inventors: Takamitsu Tsuchimoto, Kawasaki; Saburo Kaneda, Yokohama; Tatsushi Miyazawa, Kawasaki; Toshio Shimada, Kamakura; Hideo Suzuki, Kawasaki; Mitsuru Sanagai; Kaoru Hiraoka, both of Yokohama, all of Japan

[73] Assignee: Fujitsu Limited, Kanagawa, Japan

[21] Appl. No.: 204,931

[22] Filed: Nov. 7, 1980

[30] Foreign Application Priority Data

Nov. 12, 1979 [JP] Japan ............... 54-146164

[51] Int. Cl.³ .................. G06F 15/16; G06F 15/20; G06F 7/00
[52] U.S. Cl. .................................................. 364/200
[58] Field of Search ... 364/200 MS File, 900 MS File; 370/60, 61

[56] References Cited

U.S. PATENT DOCUMENTS

| | | | |
|---|---|---|---|
| 3,979,733 | 9/1976 | Fraser | 370/60 |
| 4,065,810 | 2/1977 | Cramer et al. | 364/200 |
| 4,074,232 | 2/1978 | Otomo et al. | 370/60 |
| 4,156,932 | 5/1979 | Robinson et al. | 364/200 |
| 4,272,819 | 6/1981 | Katsumata et al. | 364/200 |
| 4,323,966 | 4/1982 | Whiteside et al. | 364/200 |
| 4,363,094 | 12/1982 | Kaul et al. | 364/200 |

Primary Examiner—Harvey E. Springborn
Attorney, Agent, or Firm—Staas & Halsey

[57] ABSTRACT

A communication system operation between computer systems which realizes highly efficient data transfer in a data processing system has sender and receiver subsystems operating under the control of an independent or common operating system. The communication system also includes: a plurality of sending buffers, a sending buffer address table having a plurality of entries and a buffer control block in the sender subsystem and a plurality of receiving buffers, a receiving buffer address table having a plurality of entries and a buffer control block in the receiver subsystem, and the communication path for transferring the data stored in the sending buffer to the receiving buffer.

13 Claims, 12 Drawing Figures

SUBSYSTEM 1

INTERRUPTION

SUBSYSTEM 2

INTERRUPTION

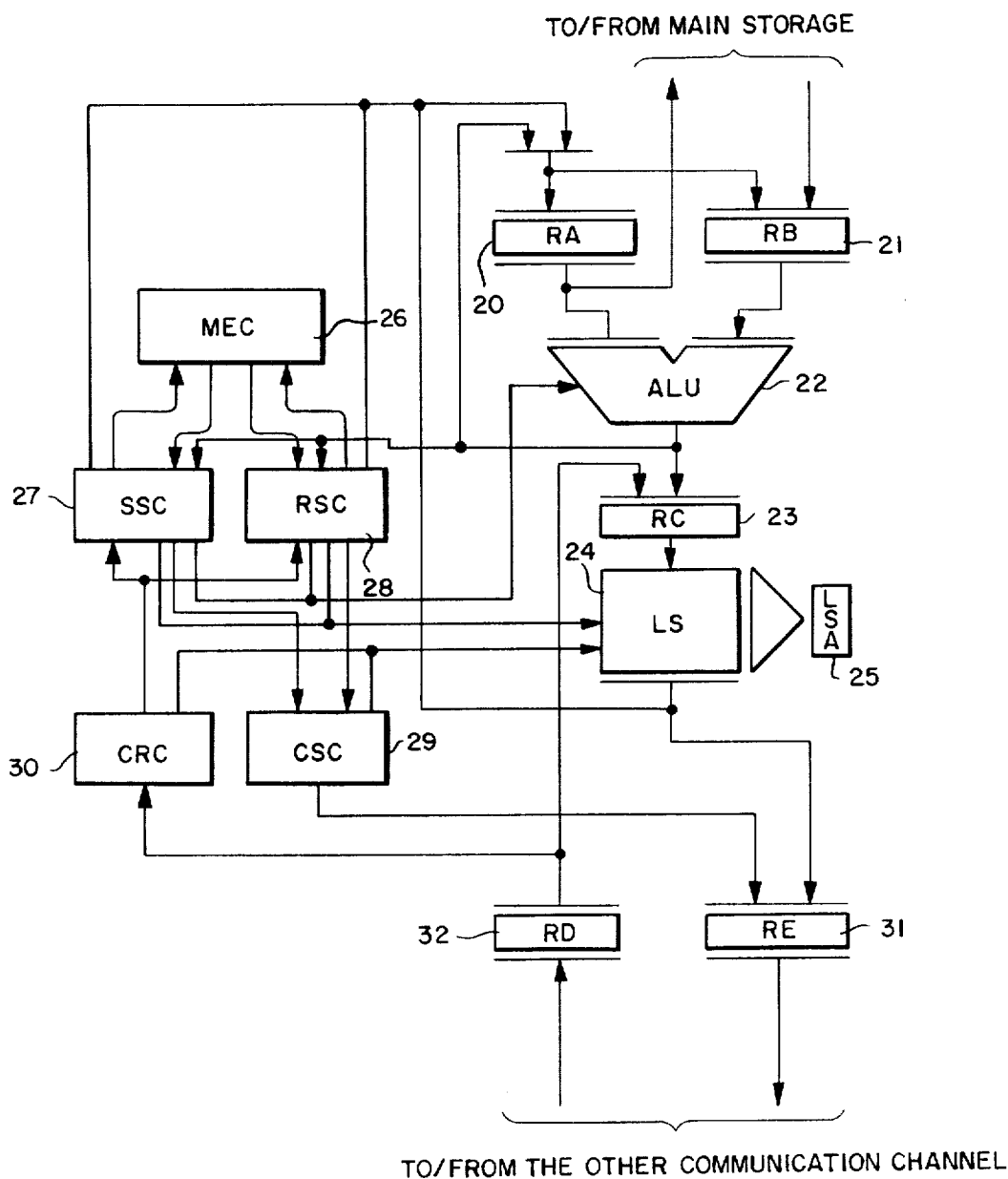

INTER-SUBSYSTEM COMMUNICATION SYSTEM

BACKGROUND OF THE INVENTION

This invention relates to a communication system between a plurality of computer systems (subsystems), particularly to an inter-subsystem communication system which realizes highly efficient data transfer by making it no longer necessary to issue the start input-/output device instruction (SIO instruction) for each data transfer and by minimizing the number of times interruptions are generated.

For an inter-subsystem connection system, an inter-subsystem connecting system connects by means of a inter-channel connecting system channel to channel adapter CTCA as illustrated in FIG. 1 and the connecting system utilizing communication between multiprocessors as illustrated in FIG. 2 are conventionally used.

In each system a main storage, a CPU and a channel form respective subsystems and the CTCA establishes the communication link connecting the subsystems. When the start IO instruction SIO is issued starting the inter-subsystem communication by the CPU of one subsystem to a channel of the same subsystem, a channel reads the channel address word CAW stored in main storage, decodes the contents of a channel control word CCW in the address specified by the channel address word CAW, and executes the channel input/output sequence.

The inter-subsystem connecting system by using the CTCA has the following disadvantages (i) CTCA operations can be initiated only by the CCW and such operations do not have a high grade intelligence since they are limited because: (1) A chain of CCWs must be generated each time a message needs to be transferred; and (2) Queuing is managed by an I/O control program in the CPU not the CTCA.

(ii) Termination of the CTCA operation is always communicated to the CPU by means of an interruption method and therefore transfer overhead caused by interruption processing becomes large in the CPU.

(iii) It is difficult for the CPU to designate a priority sequence for the channel execution programs since they are executed sequentially.

FIG. 2 is a block diagram illustrating a conventional example of the I/O subsystem as structured in the conventional multiprocessor system.

In FIG. 2, the left half is the host subsystem, while the right half is the I/O subsystem.

Main storage stores instructions for CPU$_1$ and CPU$_2$, data for CPU$_1$ and CPU$_2$, instructions for I/O processor IOP$_1$ and IOP$_2$, data for I/O processor IOP$_1$ and IOP$_2$, and the data for communication to I/O devices and between multiprocessing systems. Into the area storing data (information) for communication, for example, the contents of the data to be sent to the subsystem by the host system are written. When the SIG-P (signal processor) instruction is issued to the subsystem from the host system an interruption is scheduled for the I/O processor IOP$_1$ or IOP$_2$, at the interrupt the I/O processor IOP$_1$ or IOP$_2$ reads the data (information) written in the storage area and operates to execute the SIG-P instruction for the contents of the storage area. In the system indicated in FIG. 2, the information in the SIG-P (a signal processor) instruction stored in the common memory forms the communication means. FIG. 2 has the following problems:

(I) In the case of the SIG-P instruction, when an interruption is issued specifying the particular processor and the message issuing subsystem must check the condition of the subsystem to be interrupted and judge whether the message receiving processor and can be interrupted.

(II) Since the subsystems are tightly coupled, it is difficult to increase the physical distance between subsystems and thus the efficiency is degraded.

SUMMARY OF THE INVENTION

This invention is based on the above investigations and it is an object of this invention to offer an inter-subsystem communication system which meets the following requirements:

(1) A software protocol at a logically high level is used for communication between subsystems.
(2) The number of interruptions required for inter-subsystem communication are minimized.
(3) Requests are transmitted to subsystems in accordance with a priority and priority processing is carried out correctly between subsystems.
(4) Degradation of efficiency and increases in the amount and complexity of hardware in a long inter-subsystem physical distance are minimized.
(5) Recovery processing when a hardware error has occurred is done efficiently by the operating system software.
(6) Highly efficient data transfer and high speed response characteristics can be assured.
(7) Wide application to total systems varying from a simple inter-system coupling to a complex system is possible, in addition, the total system structure utilizes the special purpose subsystems.

In order to attain the aformentioned objects, this invention includes first and the second subsystems which operate under the control of independent (if the subsystems are located at different physical locations); or common (if the subsystems are physically located together); operating system software, where the first or sender subsystem has n sender buffers while the second receiver subsystem has m receiving buffers in respective main storages. The sender subsystem has a sending buffer address table having n entries while the receiver subsystem has a receiving buffer address table having m entries in their respective main storages. Each of the entries contains the header addres information for corresponding sending the receiving buffers and the length information or equivalently the final address information for the relevant buffer.

The sender subsystem has a buffer control data block including a header address for the sending buffer address table, the number of entries in the table, enqueue pointer which points take buffer address stored in the table of a buffer to be enqueued next and a dequeue pointer which points to a buffer address stored in the table of a buffer to be dequeued next in the main storage or register of the relevant sender subsystem. The receiver subsystem has a buffer control data block including a header address for the receiving buffer address table, the number of entries in the table, an enqueue pointer which points to a buffer address stored in the table of a buffer to be enqueued next and a dequeue pointer which points to a buffer address stored in the table of a buffer to be dequeued next in the main storage or register of the relevant receiver subsystem.

The invention also includes communication paths for transferring data stored in the sending buffers of the sender subsystem to the receiving buffers of the corresponding connected receiver subsystem.

BRIEF DESCRIPTION OF THE DRAWINGS

FIG. 10 is a block diagram of the communication channel for an embodiment of this invention.

DESCRIPTION OF THE PREFERRED EMBODIMENTS

The communication link which is an embodiment of this invention will be explained first.

Figure 1:
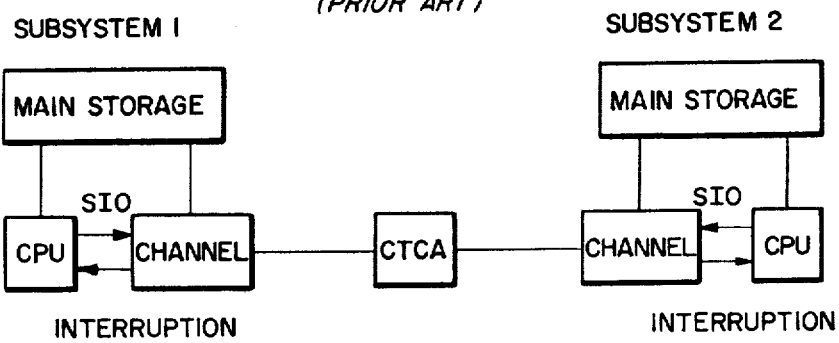
FIG. 1 is a block diagram of the inter-subsystem connecting system connected by means of the inter-channel connecting system.
Figure 2:
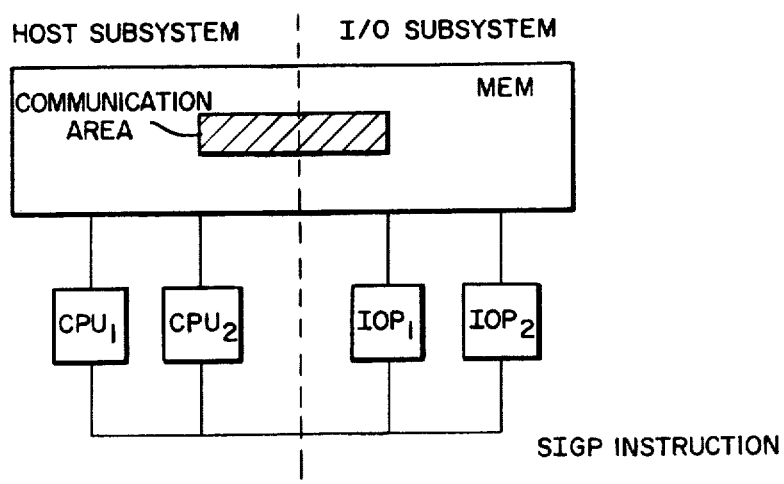
FIG. 2 is a block diagram illustrating the inter-multiprocessor communication system.
Figure 3:
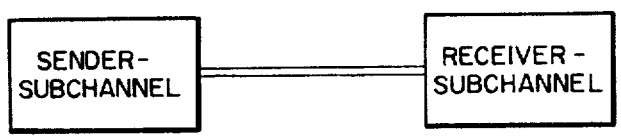
FIG. 3 is a block diagram illustrating the concept of the communication link of an embodiment of this invention.

A special purpose communication channel is included in order to operate this invention, and this communication channel is provided in both subsystems and the channels are connected physically. The communication channel, generally, comprises a plurality of sender sub-channels or receiver sub-channels. The sender sub-channels of one subsystem are connected to the receiver subchannels of the other subsystem on a one to one basis, and each sub-channel forms a logically independent communication path. FIG. 3 shows the connection of the communication link of this invention. The subchannels in one communication channel are logically independent of each other, but they are dependent on each other during performance because they operate using the hardware in common. In addition, a single physical communication path can be operated as a plurality of logically independent communication links.

The sender and receiver subchannels individually have both stop and operate modes and when a pair of sender and receiver subchannels which form a single communication path are in the operating mode, data transfer over the communication path is possible.

In the embodiment, starting and stopping of subchannels are controlled by the start I/O and instruction SIO and halt instruction HIO. When the sender and receiver subchannels forming the communication path in the stop mode are started by the SIO instruction, the communication path starts the data transfer operation. Data transfer over the communication path is performed by transferring the unit of the data stored in a single sender buffer area, namely the queue element (QE). In an embodiment of this invention, the length of QE is considered as equal to the length of the buffer area storing it and the entire contents of a single sending buffer are transferred to the corresponding sending buffer area of the other system. Transfer of a single QE is performed at a high speed by the following three operations of the communication path:

1. Reading QE from the sending buffer by means of the sender subchannel,
2. Transferring said QE to the receiver subchannel from the sender subchannel, and
3. Writing the QE into the receiver buffer area by means of the receiver subchannel.

The data transfer operation in an embodiment of this invention will now be explained by referring through FIG. 4 to FIG. 9.

Figure 4:
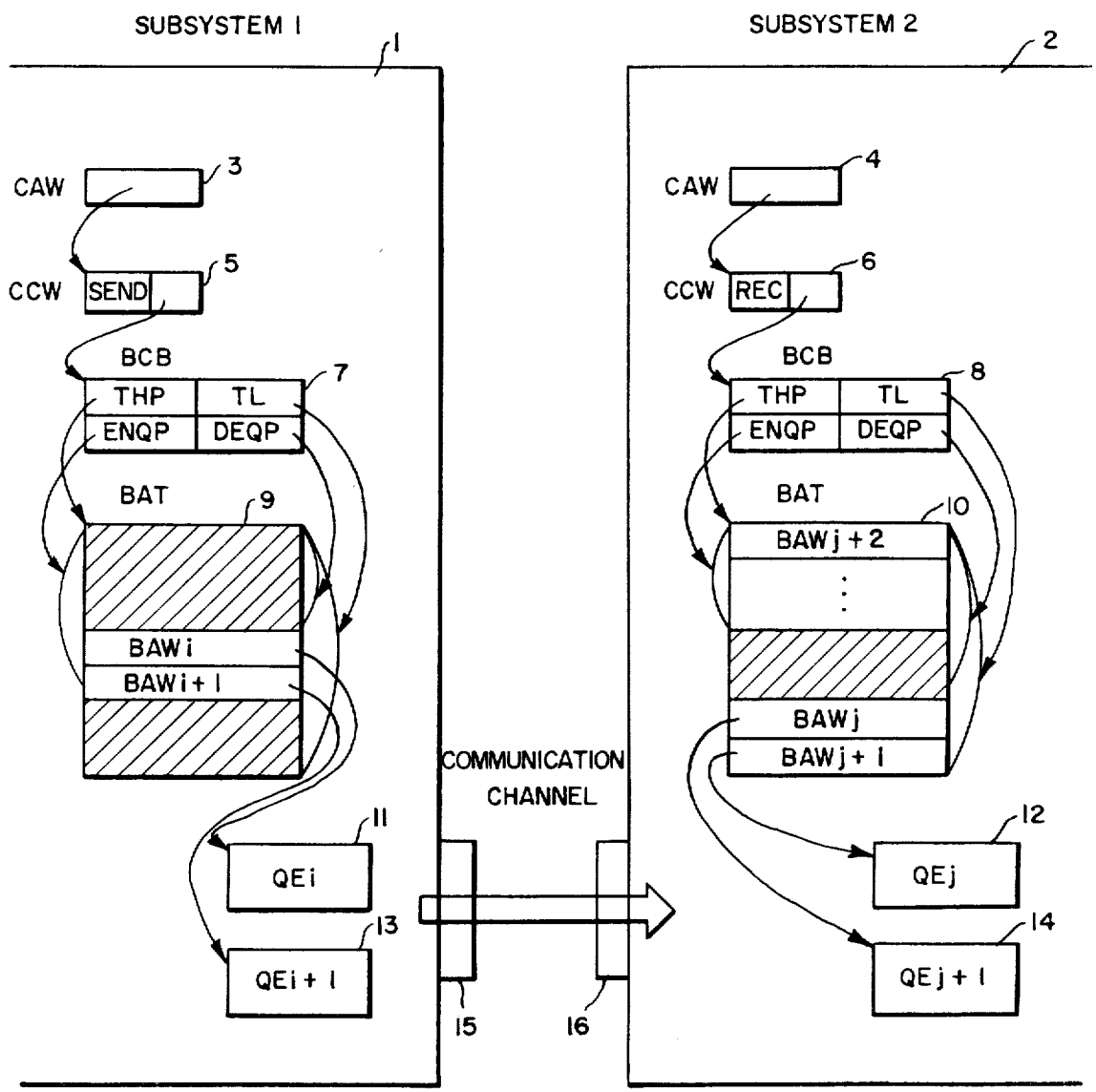
FIG. 4 is a block diagram illustrating the communication system of an embodiment of this invention.

FIG. 4 indicates a communication system for an embodiment of this invention. In this figure, 1 and 2 are the main storage areas of the subsystems 1 and 2. Blocks 3 and 4 are the channel address words (CAW) of subsystems 1 and 2, where a protection key and a header address of channel command word to be used in the protection mechanism for access to the main storage are stored. The contents of the CAW are given to the sender (or receiver) subchannel while the CPU is executing the SIO instruction.

Figure 5:
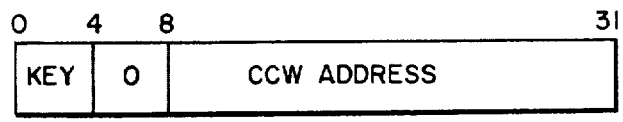
FIG. 5 is a block diagram illustrating the format of the channel address word CAW.
Figure 6:
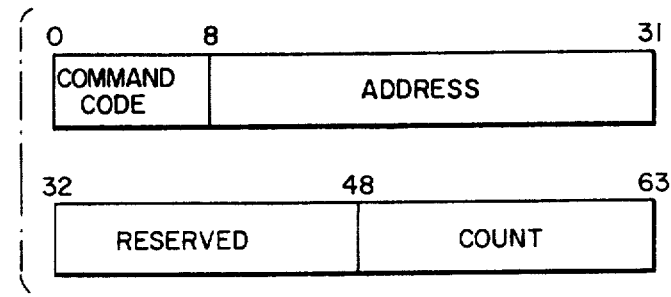
FIG. 6 is a block diagram illustrating the format of the channel control word CCW.

FIG. 5 indicates the profile of the CAW. In FIG. 4, blocks 5 and 6 are the channel control words CCW of the subsystems 1 and 2. FIG. 6 shows the format of the channel control words CCW. The command code indicates SEND, RECEIVE, or SENSE. The SEND command is effective only in the sender subchannel and is used to change the sender subchannel mode from stop to operate. The RECEIVE command is effective only in the receiver subchannel and is used to change the receiver subchannel mode from stop to operate. The SENSE command is effective in the sender or receiver subchannels and is used for storing the SENSE information in the main storage when the subchannels hold the SENSE information.

The address of the CCW indicates either the header address of the sending buffer control block BCB for the SEND command, the header address of the receiver buffer control block BCB for the RECEIVE command or the header address of the SENSE information storing area for the SENSE command. The count field is not used for the SEND or RECEIVE commands but indicates a value for SENSE information to be stored by the SENSE command.

Figure 7:
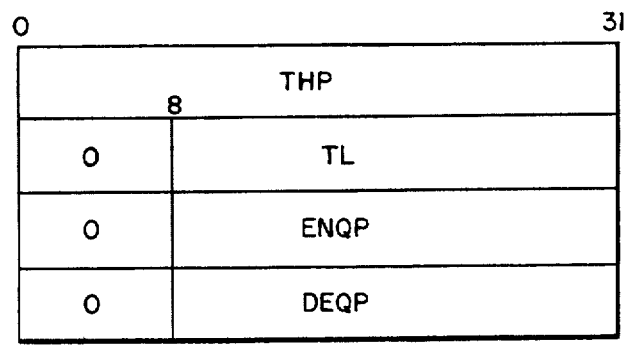
FIG. 7 is a block diagram illustrating the format of a buffer control block BCB.

In FIG. 4, blocks 7 and 8 are the buffer control blocks (BCB) of the subsystems 1 and 2. FIG. 7 indicates the format of buffer control data block BCB. In an embodiment of this invention, the BCB is provided in the main storage but it can also be provided in a register. A header address pointer THP indicates a header address of the buffer address table BAT. TL indicates the number of entries in the buffer address table. An enqueue pointer (ENQP) specifies the entry number (0 to TL-1) of the buffer address table and specifies the buffer to be enqueued next. A dequeue pointer (DEQP) specifies the entry number (0 to TL-1) of the buffer address table and also specifies the buffer to be dequeued next. Both ENQP and DEQP are updated by an increment of 1 for every enqueue or dequeue of the QE and are also set to 0 when they coincide with TL-1.

Figure 8:
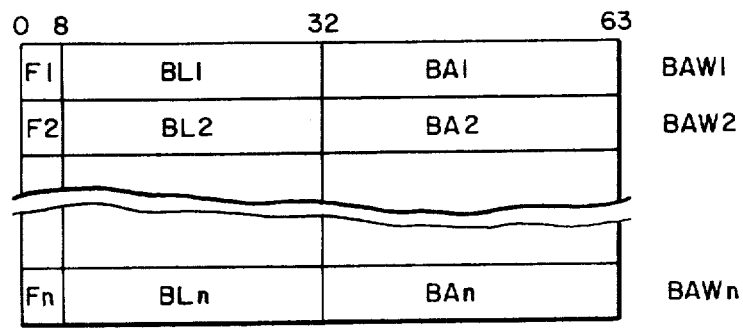
FIG. 8 is a block diagram illustrating the format of a buffer address table BAT.
Figure 9:
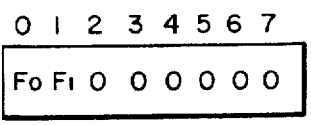
FIG. 9 is a block diagram illustrating the profile of an F field of a buffer address word BAW.

In FIG. 4, blocks 9 and 10 are the buffer address tables of subsystems 1 and 2. FIG. 8 shows the format of the buffer address table BAT. Each entry in the table in FIG. 8 consists of 8 bytes and is called the buffer address word BAW. Each BAW consists of the flag field F, a buffer length field BL and a buffer address field BA. The flat field contains the bits for controlling interruption. FIG. 9 shows an example of such bits. A buffer length BL indicates the length of the sending or receiving buffer, while BA indicates the header address of the buffer.

The bits numbered 0 and 1 in FIG. 9 are for controlling interruption; and the programs in the sender subsystem can control interruption by setting and resetting these bits when the contents of the sending buffer specified by said BAW is transferred to the receiving buffer. When the bit 0 (F0) is set, an interruption is reported in the sender subsystem, while when the bit 1 (F1) is set, it is reported in the receiver subsystem.

In FIG. 4, blocks 11 to 14 are the buffer areas specified by the BAW. QE indicates that the queue element is stored in the buffer area.

In FIG. 4, blocks 15 and 16 are the communicated channels which are the hardware mechanisms for data transfer which is done asynchronously with respect to the execution of CPU programs.

The data transfer from the sender subsystem to the receiver subsystem will now be explained by referring to FIG. 4.

FIG. 4 indicates a one-way communication path where the subsystem 1 is included in the sending side, while the subsystem 2 is included in the receiving side. When another one-way communication path for the reverse direction is provided, a two-way communication path can be realized between the subsystem 1 and subsystem 2. Programs in the sender subsystem write the queue element (QE) format data into the sending buffer specified by the enqueue pointer of the sending buffer control block and allows data transfer to the communication path by updating the enqueue pointer. The programs then signify that this queue element is to be transferred to the another subsystem by setting the bit 0 of the buffer address word (BAW) specified by the enqueue pointer to 1 before updating the enqueue pointer. When the bit 1 is set to 1, transfer of this queue element is signified to the programs of the other subsystem. The programs schedule an interruption and the channel status word is updated and the type of interruption is indicated by means of the channel status word (CSW) stored at that time. The programs are capable of enqueueing continuously until the enqueue pointer value reaches the dequeue pointer value −1. In this queueing operation, programs do not use at any time the SIO instruction and it is apparent that the overhead is reduced as compared with processor instruction execution conventional method.

On the other hand, the sender subchannel of the communication path in the operating mode checks at constant intervals on whether there is a queue element to be transferred to the other subsystem. In other words, the sender subchannel compares the enqueue pointer and dequeue pointer at constant intervals for whether or not they coincide. When the pointer values coincide, the sender subchannel recognizes it as a condition where there is no queue element to be transmitted and then enters the waiting condition for a certain period. When this condition is repeated continuously for a certain number of times, the sender subchannel causes the SIO instruction termination interruption in the sender subsystem and enters the stop mode. If the enqueue pointer and dequeue pointer do not coincide, the sender subsystem considers it as a condition where there is at least one queue element to be transmitted, and it then checks on whether the receiver subsystem can receive. For example, a check is made on whether the receiving buffer indicated by the enqueue pointer in the receiving system is full, or on whether the length of the receiving buffer is longer than the length of the sending queue element. When reception is possible, the communication path starts the queue element transfer operation. The transfer operation is completed when the queue element is stored in the receiving buffer, the enqueue pointer in the receiving side is updated, and the dequeue pointer in the sending side is updated. At this time, if bit 0 of the BAW in the sending side is 1, an interruption occurs in the sending side, and when bit 1 of the buffer address word is 1, an interruption occurs in the receiver side, each informing side that the queue element has been transferred. In this embodiment, even when such interruption occurs, the operating mode is continued without entering the stop mode. When a single transfer of queue element is completed, a check is made on whether there is a next queue element. If so, the aforementioned operations are repeated.

The programs in the receiver side dequeue the queue element in the receiving buffer from the buffer. Moreover, the programs in the receiver side may compare the enqueue pointer and dequeue pointer in the receiving buffer control block to determine if there is a queue element that has been received. When they coincide, it is recognized that there is no queue element, but if they do not coincide, it is recognized that there is a queue element. When they do not coincide, the program dequeues and updates the dequeue pointer. The program in the receiver side may alternately dequeue the queue element, without comparing both pointers, by using the trigger caused by the aforementioned interruption specification bit 1 of the sender BAW.

It is also possible to consider the method of including buffer final address information in place of the buffer length information in the BAW.

Operations of the sender side programs, the communication path and the receiver side programs are described above, and since these can operate simultaneously and a high speed data transfer can be realized.

Moreover, since the number of interruptions are minimized, the overhead due to interruption is successfully reduced.

A specific data transfer operation is explained below by using the block diagram showing an embodiment of the communication channel illustrated in FIG. 10.

In FIG. 10, block 20 is a register RA and is used as one input register for the arithmetic logic unit ALU and as the buffer register during writing to the main storage; block 21 is a register RB and is used as a second input register for the arithmetic logic unit ALU and as the buffer register during readout from the main storage; block 22 is an arithmetic addition/substraction circuit or an arithmetic logic unit ALU, block 23 is a buffer register RC used during writing to local storage LS; block 24 is the local storage LS used as the buffer for the data of queuing element QE; block 25 is a local storage LS address register LSA; block 26 is a main storage access control circuit MEC; block 27 is a sender subchannel (SSC); 28 is a receiver subchannel RSC; block 29 is a command sending control circuit CSC; block 30 is a command receiving control circuit CRC; block 31 is a buffer register RE for sending data to the other channel; block 32 is a buffer register RD for receiving data from the other channel.

The communication channel indicated in FIG. 10 has the structure necessary for simultaneously executing the sending and receiving operations. The sending operation is controlled by the sender subchannel SSC 27, while the receiving operation is controlled by the receiver subchannel RSC 28, respectively.

The sender subchannel 27 is coupled with the receiver subchannel of the other system and thereby a series of transfers of queing elements QE becomes possible.

Figure 11:
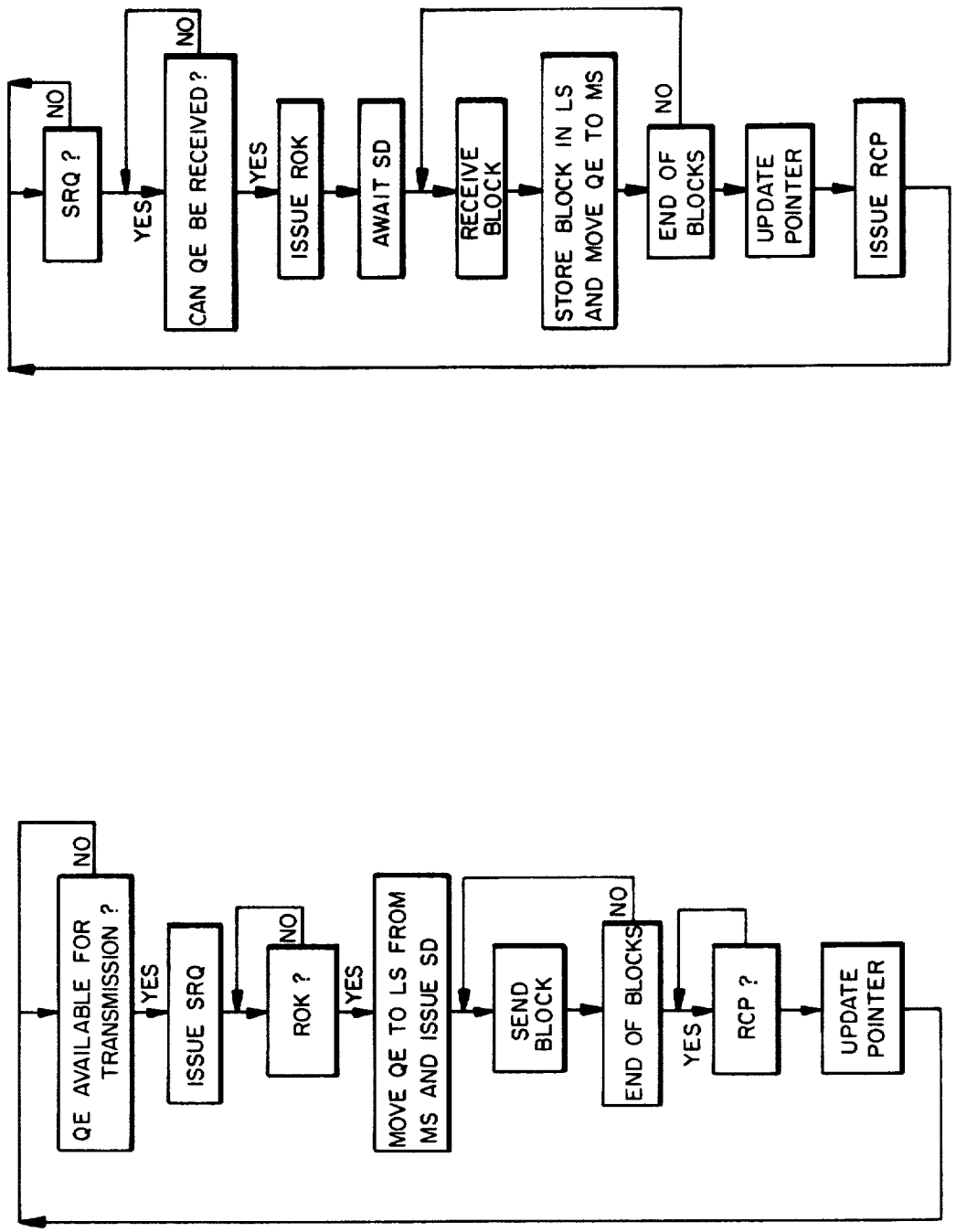

(i) Operation of Sender Subchannel 27 as Illustrated in FIG. 11

The sender subchannel 27 checks to see whether there is a QE to be transmitted at constant intervals when it enters the operating mode. This sender subchannel 27 reads ENQP and DEQP from the main storage and sends the ENQP to the register RA 20 and DEQP to the register RB 21. The ALU 22 compare the contents of register RA with register RB. When they coincide, it is recognized that there is no queing element QE to be transmitted, but when they do not coincide, it is recognized that there is a QE to be transmitted. If they do not coincide, SSC 27 issues a send request command SRQ to the receiver subchannel 28 of the other system in order to inquire whether a QE can be received. This send request command is sent to the command sending control CSC 29 by the SSC 27, the CSC 31 sends the command to the register RE 31 and register RE 31 sends it to the other system. The answering command sent from the receiver subchannel 28 of the other system is received by the register RD 32, partially interpreted by the command receiving control CRC 30 and then passed to SSC 27. The answering command can be received ok command ROK which signifys the possibility of reception or a receive not ok command RNOK which signifys the impossibility of reception. If SSC 27 receives the RNOK, it enters the waiting mode until it receives the ROK.

When SSC 27 receives the ROk, it loads the QE in the main storage into the LS 24 divided into specified length segments called blocks (for example, 64 bytes in this unit is called a block hereafter), and issues the sending command SD in order to send one block of data to the other system. SSC 27 sends the SD command to CSC 29, which successively sends the specified amount of data, beginning with the SD command, to the register RE 31. The block data contains the SD command field, bits for indicating whether this is the final block, bits requesting interruption of the other system and bits for indicating the length of the blocks. The block transfer is continued until the last block of the QE is transferred, and when the final block is transmitted, the sender subchannel SSC 27 waits for the reception of an end reporting command RCP sent from the receiver subchannel 28 of the other system. The end reporting command RCP is received in a manner similar to the receipt of the answering command above-discussed. When SSC 27 receives the command RCP, it updates the DEQP corresponding to the channel stored in the main storage. Updating DEQP is conducted as follows. The DEQP of the BCB is loaded into the register RB 21, a specified value is added to the contents of the register RB 21 by the arithmetic logic unit ALU 22 and the result placed in the register RA 20. Then, the table length TL of the BCB is loaded in the register RB 21 and the contents of register RA 20 and register RB 21 are compared by ALU 22. When they coincide, zero is stored in the DEQP in the main storage as the updated value of DEQP. If they do not coincide, a the value in register RA 20 is stored in the DEQP main memory. Transfer of a single QE completed with the abovementoned operations and thereafter the transfer operation of the next QE is repeated accomplished by repeating the above-discussed operations.

Figure 12:
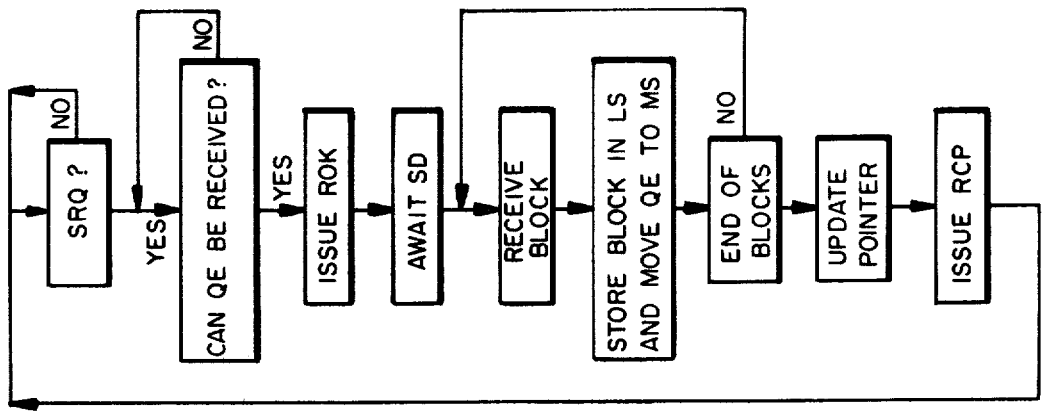
FIGS. 11 and 12 are flow charts for the embodiment of the invention.

(ii) Operation of Receiver Subchannel RSC 28 as Illustrated in FIG. 12

The receiver subchannel 28 waits, when it enters the operation mode, for the send request command SRQ being transmitted from the sender subchannel of the other system. The SRQ command is partially interpreted by CRC 30 when it is received by the register RD 32 and then passed to RSC 28. RSC 28 reads the ENQP and the DEQP from the BCB of main storage in order to check the possibility of reception and sends them to the registers RA 20 and RB 21 respectively.

They are compared by ALU 22. When the contents of the registers coincide, it is recognized that reception is impossible, and when the contents of the register do not coincide, it is recognized that reception is possible. If reception is possible, the command ROK is generated to the sender subchannel of the other system, or if reception is impossible, the command RNOK is generated, while waiting for the reception of the SD command.

When the SD command is received, a command part is passed to RSC 28 via the CRC 30 and a succeeding data part is written into LS 24 by under the control of the CRC 30. After verifying that a block is written into LS 24, RSC 28 writes the block into main storage. This operation is repeated until the final block is written into main storage. When the final block is written into main storage, the ENQP corresponding to the subchannel is updated as follows. ENQP is loaded into the register RB 21 from the main storage, a specified value is added, and the total value is set into the register RA 20. Then, the table length TL in the BCB is loaded into the register RB 21 and the arithmetic logic unit compares the contents of register RB 21 with the contents of RA 20. If they coincide, zero is stored in ENQP as the value after updating. If they do not coincide, the contents of register RA 20 is stored in ENQP stored in the main memory. When the above updating of ENQP is complete, the receiver subchannel 28 generate the end report with the command RCP. This command is transferred to the register RE 31 and sent to the sending subchannel SSC 27 of the other system. Thereafter, when the next QE send request is received, similar operations are repeated. As explained above, according to the intersubsystem communication system of this invention, it is no longer necessary to issue the start I/O instruction SIO for each data transfer and therefore the generation of interruptions is minimized and highly efficient transfer of data can be realized.

While the present invention has been described with respect to a specific embodiment thereof, it is to be understood that the present invention is not limited thereto in any way but covers any and all changes and modifications which will become possible within the scope of the appended claims.

What is claimed is:

1. An intercomputer system communication system in a data processing system comprising first and second subsystems each having main storage and each operating under the control of an operating system;

said first subsystem further comprising a sender subsystem having n sending buffers in the respective main storage;

said second subsystem further comprising a receiver subsystem having m receiving buffers in the respective main storage;

said sender subsystem further comprising a sending buffer address table in the respective main storage having n entries;

said receiver subsystem further comprising a receiving buffer address table in the respective main storage having m entries;

each of said n and m entries comprising header address information for corresponding said n sending and m receiving buffers and length information for the respective buffer;

said sender subsystem further comprising a sender buffer control data block in main storage including:

a header address for the sending buffer address table;

said n entries in said sending buffer address table;

an enqueue pointer which indicates which of said n entries is to be enqueued next; and a dequeue pointer which indicates which of said n entries is to be dequeued next into the respective main storage;

said receiver subsystem further comprising a receiver buffer control data block in main storage including:

a header address for the receiving buffer address table;

said m entries in said receiving address buffer table;

an enqueue pointer which indicates which of said m entries is to be enqueued next; and a dequeue pointer which indicates which of said m entries is to be dequeued next into respective main storage; and said communication system further comprising a communication unit, operatively connected between said sender subsystem and said receiver subsystem, for transferring data stored in said n sending buffers of the sender subsystem to said m receiving buffers of the receiver subsystem.

2. A communication system between computer systems in accordance with claim 1, further comprising a first one bit indicator for requesting interruption of the receiver subsystem which is provided as the first bit of each entry in said sending buffer address table and which is set by the sender subsystem, and when the sender subsystem sets said one bit indicator, said communication unit communicates an interruption to the receiver subsystem when the contents of the one of the n sending buffers specified by said entry are transferred to one of the m receiving buffers of the receiver subsystem.

3. A communication system between computer systems in accordance with claim 2, further comprising a second one bit indicator for requesting interruption of the sender subsystem which is provided as the first bit of each entry in said sending buffer address table and which is set by the sender subsystem, and when the sender subsystem sets said one bit indicator, said communication unit communicates an interruption to the sender subsystem when the contents of the one of the n sending buffers indicated by said entry are transferred to one of the m receiving buffers of the receiver subsystem.

4. A communication system between computer systems in accordance with claim 3:

wherein said sender subsystem further includes means for generating a send request;

wherein said communication unit further includes means for providing a stop and an operation mode;

wherein the sender subsystem and receiver subsystems are connected via said communication unit and each include means for generating an I/O start instruction and an I/O stop instruction at separate times;

wherein said communication unit enters, if it is in the stop mode, the operation mode in response to the I/O start instruction issued by either of said subsystems, thereafter the operations for transferring the data in the sending buffer to the receiving buffer are continued until one of the following occurs: the I/O stop instruction is later generated by one of the subsystems; no send request is generated by the sending side for a specified period; and until an event is detected which makes impossible the transfer operation in the communication unit.

5. A communication system between computer systems in accordance with claim 4:

wherein said communication unit further includes means for writing data and when said communication unit is in the operation mode, data is written into the sending buffer indicated by the enqueue pointer of the sending buffer control block without indicating data transfer to the relevant communication unit using the start I/O instruction and simultaneously data transfer is indicated to the relevant communication unit by updating said enqueue pointer; and wherein said communication unit further includes comparison means and said communication unit compares the dequeue pointer and the enqueue pointer of said sending buffer control block and starts the data transfer when detected incoincidence and updates the dequeue pointer when data transfer is complete.

6. An inter-computer system communication system in a data processing system comprising:

a sender subsystem, including a sender main storage comprising:

n sending buffers;

a sending buffer address-table;

n buffer address word entries, each of the buffer address word entries including buffer header address information and buffer length information for each of the respective n sending buffers; and a buffer control data block including a sending buffer address table header address, a table length ledger for storing a number of entries in the sending buffer address table, an enqueue pointer containing the address of the buffer address word entry to be enqueued next, and a dequeue pointer containing the address of the buffer address word entry to be dequeued next;

a receiver subsystem, including a receiver main storage comprising:

m receiving buffers;

a receiving buffer address table;

m buffer address word entries, each of the buffer address entries including buffer header address information and buffer length information for each of the respective m receiver buffers; and a buffer control data block in the receiver main storage including a receiving buffer address table header address, a table length ledger containing a number of entries in the receiving buffer address table, an enqueue pointer containing the address of the buffer address word entry to be enqueued next, and a dequeue pointer containing the address of the buffer address word entry to be dequeued next; and a communication path, operatively connected between the n sending buffers of said sender subsystem and the m receiving buffers of said receiver subsystem, for transferring the data stored in the n sending buffers to the m receiving buffers.

7. An inter-computer system communication system as recited in claim 6, wherein said sender and receiver subsystems operate under the control of an independent operating system.

8. An inter-computer system communication system as recited in claim 6, wherein said sender and receiver subsystems operate under the control of a common operating system.

9. A method of data transfer between first and second computer systems, using a queuing element which is stored in a main storage for the data transfer, an enqueue pointer, a dequeue pointer, local storage and an arithmetic logic unit, said method comprising a sending method and a receiving method, said sending method for the first computer system comprising the steps of:

(a) determining whether a queuing element is available for transmission;

(b) issuing a send request command to the second computer system if a queuing element is available for transmission;

(c) waiting until a receive-ok command is received from the second computer system;

(d) moving the queuing element from main storage into local storage and dividing the queuing element into data blocks;

(e) issuing a sending command to the second computer system;

(f) sending the data blocks one at a time to the second computer system until all data blocks have been transmitted;

(g) waiting for an end reporting command from the second computer system; and (h) updating the dequeue pointer and returning to step (a); and said receiving method for the first computer system comprising the steps of:

(j) waiting until the send request command from the second computer system is received;

(k) determining whether a queuing element can be received;

(l) sending the receive-ok command to the second computer system if a queuing element can be received;

(m) waiting until the sending command is received;

(n) storing data blocks received one at a time into local storage and moving the queuing element into main storage when all data blocks have been received;

(o) updating the enqueue pointer; and (p) sending the end reporting command to the second computer system and returning to step (j).

10. A method in accordance with claim 9, wherein step (a) comprises the steps of:

(i) comparing the enqueue pointer with the dequeue pointer via the arithmetic logic unit; and (ii) indicating that a queuing element is available for transmission when the enqueue pointer and dequeue pointer coincide.

11. A method in accordance with claim 9, wherein said method further uses a buffer control data block table length, and wherein step (h) comprises the steps of:

(i) adding a constant value to the dequeue pointer via the arithmetic logic unit;

(ii) comparing the dequeue pointer increased by the constant value to the table length of the buffer control data block via the arithmetic logic unit; and (iii) storing a zero in the dequeue pointer if the comparison indicates coincidence.

12. A method in accordance with claim 9, wherein step (k) comprises the steps of:

(i) comparing the enqueue pointer with the dequeue pointer; and (ii) indicating that a queuing element can be received when the enqueue pointer and the dequeue pointer do not coincide.

13. A method in accordance with claim 9, wherein said method further uses a buffer control data block table length, and wherein step (o) comprises the steps of:

(i) adding a constant value to the enqueue pointer via the arithmetic logic unit;

(ii) comparing the enqueue pointer to the table length of the buffer control data block via the arithmetic logic unit; and (iii) storing a zero in the enqueue pointer if the comparison indicates coincidence.

* * * * *

UNITED STATES PATENT AND TRADEMARK OFFICE
CERTIFICATE OF CORRECTION

PATENT NO. : 4,414,620      Page 1 of 4
DATED : November 8, 1983
INVENTOR(S) : Tsuchimoto et al.

It is certified that error appears in the above-identified patent and that said Letters Patent is hereby corrected as shown below:

Front page [75] Inventors:

line 5, after "Sanagai" insert --Tokyo--;
    line 6, delete "both of".

[73] Assignee:

"Kanagawa" should be --Kawasaki--.

[57] ABSTRACT:

line 11, "the (second occurrence) should be --a--.

Col. 1, line 32, after "disadvantages" insert --:--.
Col. 2, line 49, "addres" should be --address--;
       line 50, "the" (first occurrence) should be
           --and--;
       line 52, after ".", continue with line 53;
       line 55, after "," (second occurrence) insert
           --an--;

UNITED STATES PATENT AND TRADEMARK OFFICE
CERTIFICATE OF CORRECTION

PATENT NO. : 4,414,620   Page 2 of 4

DATED : November 8, 1983

INVENTOR(S) : Tsuchimoto et al.

It is certified that error appears in the above-identified patent and that said Letters Patent is hereby corrected as shown below:

```
Col. 3, line  1, please delete the indention for paragraph;
        line 27, "of" should be --illustrating--.
Col. 4, line 10, "receiver" should be --receiving--;
        line 13, "through" should be --to--;
        line 14, "to" should be --through--;
        line 16, after "," insert --blocks--;
        line 41, "receiver" should be --receiving--.
Col. 5, line 18, "communicated" should be --communication--;
        line 37, delete "the" (first occurrence);
        line 49, "the" should be --processor instruction
                     execution--;
        line 50, "processor instruction execu-" should be
                     --the--;
        line 51, delete "tion".
Col. 6, line 15, "each informing" should be --informing each--;
        line 37, delete "of";
        line 60, after "QE" insert --(Fig. 4)--;
        line 63, before "28" insert --block--.
```

UNITED STATES PATENT AND TRADEMARK OFFICE
CERTIFICATE OF CORRECTION

PATENT NO. : 4,414,620

DATED : November 8, 1983

INVENTOR(S) : Tsuchimoto et al.

It is certified that error appears in the above—identified patent and that said Letters Patent is hereby corrected as shown below:

Col. 7, line 9, "queing" should be --queuing--;
       line 19, "compare" should be --compares--;
       line 21, "queing" should be --queuing--;
       line 35, "received" should be --a receive--;
               "signifys" should be --signifies--;
       line 37, "signifys" should be --signifies--;
       line 40, "ROk" should be --ROK--.

Col. 8, line 2, delete "a";
       line 4, after "QE" insert --is--;
       line 5, "toned" should be --tioned--;
       line 6, delete "repeated" (first occurrence);
       line 19, after "21" insert --,--;
       line 20, please delete the indention for paragraph;
       line 22, "register" should be --registers--;

UNITED STATES PATENT AND TRADEMARK OFFICE
CERTIFICATE OF CORRECTION

PATENT NO. : 4,414,620                 Page 4 of 4

DATED : November 8, 1983

INVENTOR(S) : Tsuchimoto et al.

It is certified that error appears in the above—identified patent and that said Letters Patent is hereby corrected as shown below:

Col. 8, line 28, after ".", continue with line 29 (no paragraph indention);
        line 31, delete "by";
        line 39, "set into" should be --sent in--;
        line 45, delete "stored" (second occurrence);
        line 48, delete "with the";
        line 53, "intersubsystem" should be --inter-subsystem--.

Signed and Sealed this

Eleventh Day of December 1984

[SEAL]

Attest:

GERALD J. MOSSINGHOFF

Attesting Officer      Commissioner of Patents and Trademarks